United States Patent
Ibanescu et al.

(10) Patent No.: US 7,421,171 B2
(45) Date of Patent: Sep. 2, 2008

(54) EFFICIENT TERAHERTZ SOURCES BY OPTICAL RECTIFICATION IN PHOTONIC CRYSTALS AND METAMATERIALS EXPLOITING TAILORED TRANSVERSE DISPERSION RELATIONS

(75) Inventors: Mihai Ibanescu, Cambridge, MA (US); Evan Reed, Livermore, CA (US); Peter Rakich, Somerville, MA (US); Steven G. Johnson, Cambridge, MA (US); Erich P. Ippen, Belmont, MA (US); John D. Joannopoulos, Belmont, MA (US); Marin Soljacic, Belmont, MA (US); Rafif E. Hamam, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/765,079

(22) Filed: Jun. 19, 2007

(65) Prior Publication Data
US 2007/0297734 A1 Dec. 27, 2007

Related U.S. Application Data

(60) Provisional application No. 60/816,207, filed on Jun. 23, 2006.

(51) Int. Cl.
G02B 6/00 (2006.01)
G02B 26/00 (2006.01)
(52) U.S. Cl. ........................ 385/122; 385/125; 385/129; 385/130; 385/131; 385/14; 359/321; 359/237; 359/238; 359/326; 359/332

(58) Field of Classification Search ................. 385/123, 385/125, 129, 130, 131, 122, 14, 140; 359/321, 359/237, 238, 326, 332
See application file for complete search history.

(56) References Cited

U.S. PATENT DOCUMENTS

| 5,999,308 | A | 12/1999 | Nelson et al. ................ 359/321 |
| 7,078,697 | B2* | 7/2006 | Barker et al. ................. 250/343 |
| 7,170,085 | B2* | 1/2007 | Raspopin et al. .............. 257/21 |
| 7,257,333 | B2* | 8/2007 | Rosenwald et al. .......... 398/201 |
| 7,272,158 | B1* | 9/2007 | Hayes et al. ................... 372/21 |
| 2004/0108471 | A1 | 6/2004 | Luo et al. .................... 438/107 |
| 2007/0009200 | A1* | 1/2007 | Hochberg et al. ............. 385/15 |
| 2007/0297734 | A1* | 12/2007 | Ibanescu et al. ............. 385/125 |

OTHER PUBLICATIONS

Gordon et al., "Tunable, high peak power terahertz radiation from optical rectification of a short modulated laser puls" Optics Express, Jul. 24, 2006, vol. 14, No. 15, pp. 6813-6822.

(Continued)

Primary Examiner—Brian M Healy
(74) Attorney, Agent, or Firm—Gauthier & Connors LLP

(57) ABSTRACT

A system and a method for generating terahertz (THz) radiation are provided. The system includes a photonic crystal structure comprising at least one nonlinear material that enables optical rectification. The photonic crystal structure is configured to have the suitable transverse dispersion relations and enhanced density photonic states so as to allow THz radiation to be emitted efficiently when an optical or near infrared pulse travels through the nonlinear part of the photonic crystal.

42 Claims, 3 Drawing Sheets

OTHER PUBLICATIONS

Maier et al., "Terhaertz Surface Plasmon-Polariton Propagation and Focusing on Periodically Corrugated Metal Wires" Physical Review Letters, Oct. 27, 2006, 2006 The American Physical Society, pp. 176805-1-176805-4.

Vodopyanov, "Optical generation of narrow-band terahertz packets in periodically-inverted electro-optic crystals: conversion efficiency and optimal laser pulse format" Optics Express, Mar. 20, 2006, vol. 14, No. 6, pp. 2263-2276.

Zinov'ev et al., "Terahertz Radiation from a Nonlinear Slab transversed by an Optical Pulse" Physical Review Letters, Jan. 26, 2007, 2007 The American Physical Society, pp. 044801-1-044801-4.

Chen et al., "Terahertz parametric generation photonic band gap structure with negligible structural dispersion in the optical range" Optics Express, Mar. 6, 2006, vol. 14, No. 5, pp. 1933-1941.

Imeshev et al., "High-power source of THz radiation based on orientation-patterened GaAs pumped by a fiber laser" OPtics Express, May 15, 2006, vol. 14, No. 10, pp. 4439-4444.

Schneider et al., "High efficiency generation and detection of terhaertz pulses using laser pulses at telecommunication wavelengths" Optics Express, Jun. 12, 2006, vol. 14, No. 12, pp. 5376-5384.

Tonouchi, "Cutting-edge terahertz technology" 2007 Nature Publishing Group, review Articles, Nature Photonics 2007, vol. 1 Feb. 2007, pp. 97-105.

Stepanov et al., "Generation, tuning, and shaping of narrow band, picosecond THz pulses by two-beam excitation" Optics Express, Sep. 20, 2004, vol. 12, No. 19, pp. 4650-4658.

Aguanno et al., "Photonic band edge effects in finite structures and applications to X(2) interactions" 2001 The American Physical Society, Physical Review E, vol. 64, pp. 016609-1-016609-9.

Chen et al., "Active terahertz metamaterial devices" 2006 Nature Publishing Group, Letters, vol. 444 Nov 30, 2006, pp. 597-600.

Dragoman et al., "Terahertz fields and applications" Pergamon, Progress in Quantum Electronics 28 (2004) pp. 1-66.

Ibanescu et al., "Extended Ultra-Flat Bands in Photonic Crystals" Lasers and Electro-Optics, 2005, Conference on Baltimore, MD, May 22-27, 2005, pp. 1165-1167.

Auston et al., "Cherenkov Radiation from Fetosecond Optical Pulses in Electro-Optic Media" Physical Review Letters, Oct. 15, 1984, vol. 53, No. 16, pp. 1555-1558.

Falco et al., "Tetrehertz pulse generation via optical rectification in photonic crystal microcavities" Optics Letters, vol. 30, No. 10, May 15, 2005, 2005 Optical Society of America, pp. 1174-1176.

\* cited by examiner

EFFICIENT TERAHERTZ SOURCES BY OPTICAL RECTIFICATION IN PHOTONIC CRYSTALS AND METAMATERIALS EXPLOITING TAILORED TRANSVERSE DISPERSION RELATIONS

PRIORITY INFORMATION

This application claims priority from provisional application Ser. No. 60/816,207 filed Jun. 23, 2006, which is incorporated herein by reference in its entirety.

BACKGROUND OF THE INVENTION

The invention is related to the field of low frequency radiation, and in particular to efficient terahertz sources by optical rectification in photonic crystals.

The terahertz (THz) frequency range can be approximately defined as $3\times10^{11}$ to $3\times10^{12}$ Hz, with corresponding wavelengths between 100 μm and 1 mm. Situated in between infrared and microwave frequencies, and in between the reach of photonic and electronic devices, the THz range has not been thoroughly explored because of a lack of good radiation sources and detectors. THz radiation can penetrate into many materials that would be opaque at higher infrared and optical frequencies. At the same time, with a wavelength less than a millimeter, terahertz radiation has an important resolution advantage over the longer wavelength microwave radiation. Consequently, THz radiation is well suited for imaging and spectroscopic applications in the medical, security and manufacturing sectors. Nevertheless, the largest weakness of this field of research is still the lack of a high-power, compact and low-cost source of THz radiation.

SUMMARY OF THE INVENTION

According to one aspect of the invention, there is provided a system for generating terahertz (THz) radiation. The system includes a photonic crystal structure comprising at least one nonlinear material that enables optical rectification. The photonic crystal structure is configured to have the suitable transverse dispersion relations and enhanced density photonic states so as to allow THz radiation to be emitted efficiently when an optical or near infrared pulse travels through the nonlinear part of the photonic crystal structure.

According to another aspect of the invention, there is provided a method of forming a terahertz (THz) radiation source. The method includes forming a photonic crystal structure comprising at least one nonlinear material that enables optical rectification. Also, the method includes configuring the photonic crystal structure to have the suitable transverse dispersion relations and enhanced density photonic states so as to allow THz radiation to be emitted efficiently when the optical or near infrared pulse travels through the nonlinear part of the photonic crystal structure.

According to another aspect of the invention, there is provided a method of producing terahertz (THz) radiation. The method includes providing an optical or near infrared pulse. Also, the method includes providing a photonic crystal structure comprising at least one nonlinear material that enables optical rectification. Furthermore, the method includes configuring the photonic crystal structure to have the suitable transverse dispersion relations and enhanced density photonic states so as to allow THz radiation to be emitted efficiently when the optical or near infrared pulse travels through the nonlinear part of the photonic crystal structure.

DETAILED DESCRIPTION OF THE INVENTION

The present invention provides a technique to improve the efficiency of THz generation via optical rectification by making use of specially tailored transverse dispersion relations in photonic crystals and the associated enhanced density of photonic states.

One of the most promising ways of generating THz radiation is to make use of the nonlinear effect named optical rectification, where an intense femtosecond laser pulse with a central wavelength in the optical regime can give rise to THz power when it travels through a bulk nonlinear electro-optic crystal. An incoming pulse can be approximated as $E(x,t)=A(x,t)*\exp[i(kx-\omega t)]$, where $A(x,t)$ is the slowly varying envelope of the pulse; it stimulates second order non-linear susceptibility $P(\omega_1+\omega_2) \sim \chi^{(2)} E(\omega_1) E(\omega_2)$ with $\omega_1 = -\omega_2$ to effectively create a new source in the material with a polarization $P_{THz}(x,t) \sim A^2(x,t)$. The radiated power due to $P_{THz}(x,t)$ is very broadband and has a typical frequency which is approximately the inverse of the time constant of the optical pulse (150 fs roughly corresponding to 1 THz).

Early experiments were able to generate only nanowatts of power with optical to terahertz conversion efficiencies around $10^{-5}$-$10^{-4}$. A recent experiment using high-power ultrafast lasers and large beam areas achieved 0.25 mW of power, but the maximum conversion efficiency is still only $5\times10^{-4}$. The main limitation in these experiments is the fundamental requirement that the input optical power has to be below the threshold of optical breakdown of the crystal.

Figure 1:
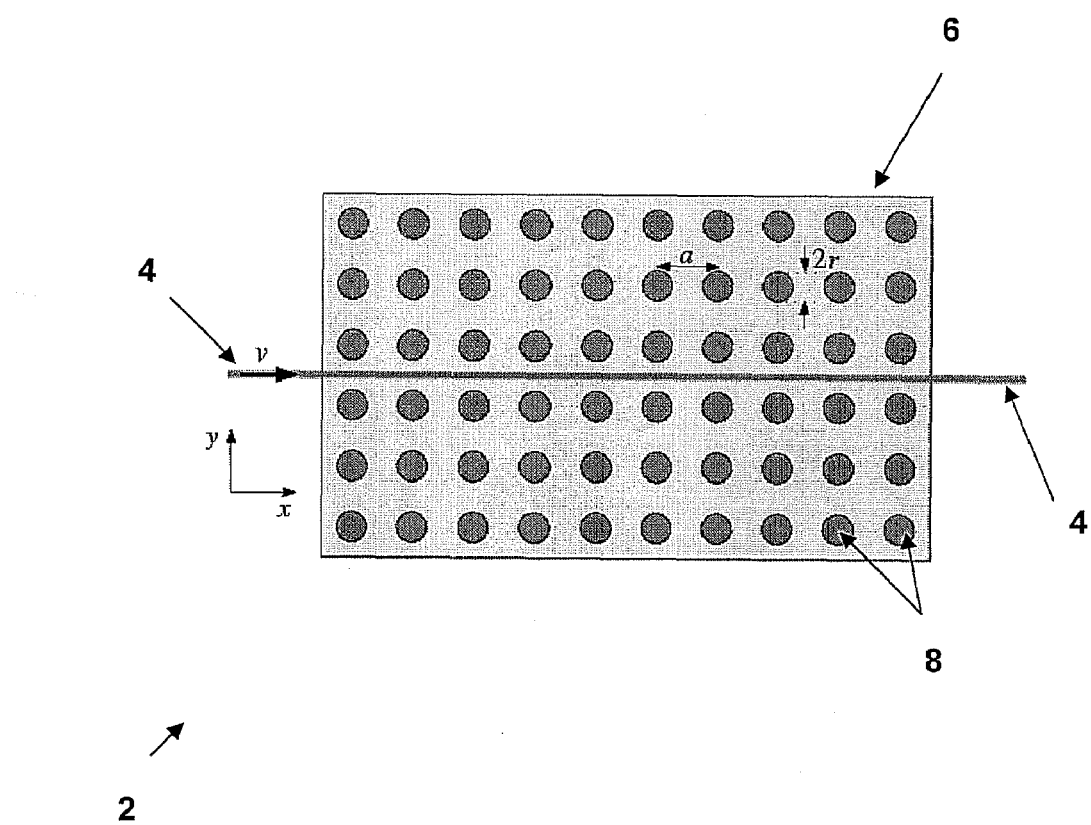
FIG. 1 is a schematic diagram illustrating a THz source formed in accordance with the invention.

FIG. 1 illustrates a THz source 2, where an ultrafast optical pulse 4 enters a region where a nonlinear crystal 6 with $\chi^{(2)}$ is patterned periodically to improve conversion efficiency. Because the wavelength of the optical or near infrared pulse 4 is much smaller than the terahertz length scales, one can assume that the pulse 4 will travel in a straight line without much diffraction. In other embodiments of the invention, a waveguide can be used to guide the pulse 4. The propagation velocity of the optical pulse 4 is given by the speed of light divided by the index of refraction of the nonlinear crystal 6 at optical frequencies. The photonic crystal 6 consists of a square lattice of rods 8, each having diameter of 2r and a separation distance of a. However, other types of nonlinear photonic crystal structures can be used, such as photonic crystals consisting of holes in a dielectric. Moreover, photonic crystals having dimensions greater then 2D can also be used.

The terahertz radiation emitted when the optical pulse 4 travels through a large length of photonic crystal 6 has to obey the Cherenkov resonance condition between its angular frequency ω and its longitudinal wave vector $k_x$: $\omega = v*(k_x+G)$, where v is the velocity at which the optical pulse 4 travels and G is a reciprocal lattice vector, a multiple of $2\pi/a$. Out of all the modes $\omega(k_x, k_y)$ of the photonic crystal 6, modes that obey the Cherenkov resonance condition are of most interest, and designing a photonic crystal 6 in order to obtain a large density of states for those modes is preferred. To accomplish this one can focus on designing the suitable photonic crystal dispersion relation in the transverse direction to the propagating pulse.

Figure 2A:
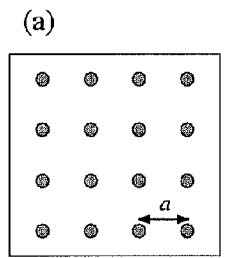
FIG. 2A is a schematic diagram illustrating a photonic crystal having the same design as the photonic crystal described in FIG. 1.
Figure 2B:
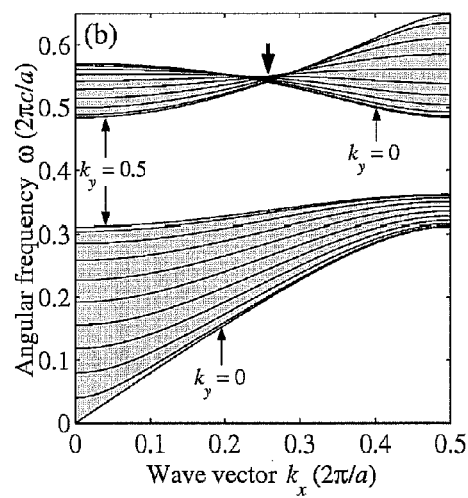
FIG. 2B is a projected band diagram of the photonic crystal shown in FIG. 2A.
Figure 2C:
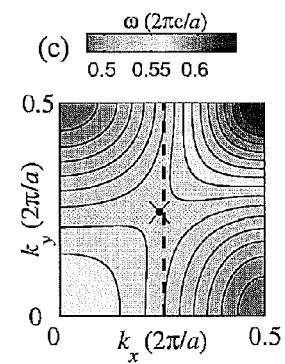
FIG. 2C is a contour graph of the second band.

FIG. 2A shows a photonic crystal having the same design as the photonic crystal 6 described in FIG. 1 and consisting of a square lattice of dielectric rods with radius r=0.13a and index of refraction n=3.5. Notice in FIG. 2B that the dispersion relation of the second band includes an ultra-flat region shown by the thick black arrow. For $k_x$=0.27 the relative frequency width of this band in the transverse direction is only about 1.6%. FIG. 2C shows a color contour plot of the second band $\omega(k_x, k_y)$. Note that here the pulse is assumed to be propagating along the x direction, thus $\omega(k_y)$ is the dispersion relation in the transverse direction.

Figure 3:
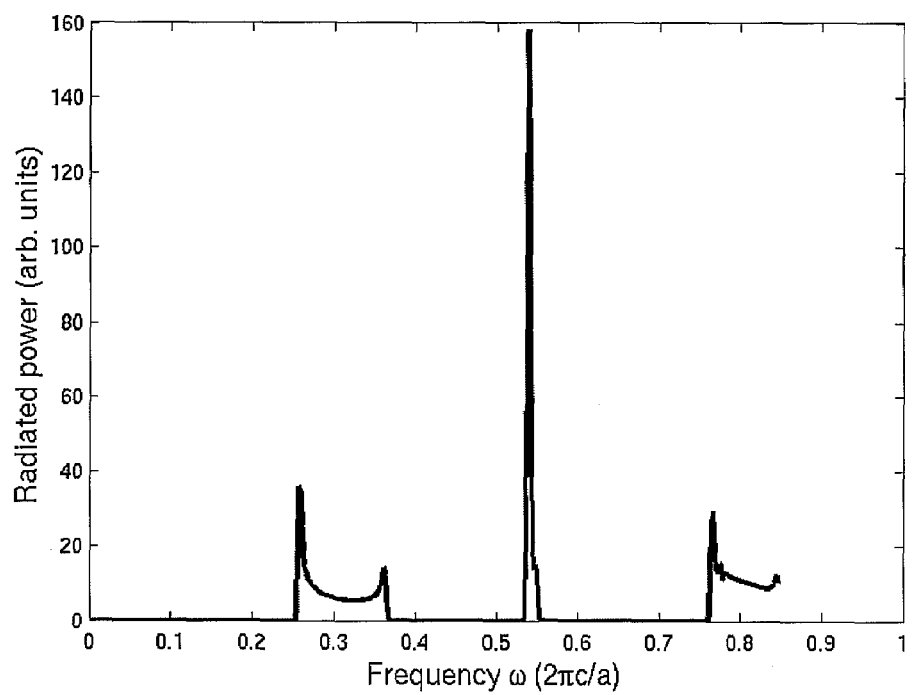
FIG. 3 is a graph illustrating a simulated radiation spectrum when an ultra-fast optical pulse travels through the photonic crystal in FIG. 1.

FIG. 3 shows how such a singularity in the band diagram of a photonic crystal can lead to enhanced generation of terahertz radiation. If an optical pulse travels through such a photonic crystal with a velocity v=0.74c then the Cherenkov resonance condition is met at the ultra-flat band and a narrow intense peak is observed in the spectrum of terahertz radiation.

Typical embodiments for a three dimensional structure with either two-dimensional or three-dimensional periodicity would include the following: (i) a 2D periodic photonic crystal slab whose thickness is on the order of the periodicity, (ii) a thick 2D periodic photonic crystal slab whose thickness is much larger than the periodicity, and (iii) a photonic crystal structure with three-dimensional periodicity.

In the case of a 2D-periodic photonic crystal slab, the designed transverse dispersion relation could be placed below the light line of the ambient medium to provide good confinement of the emitted THz radiation, or above the light line, for example to enhance normal emission if desired.

One approach to design the desired transverse dispersion relation is to modify the bulk band structure of a photonic crystal, an example of which is shown in FIG. 1. Another approach would be to break the symmetry of the photonic crystal system in the transverse direction, for example by introducing a line of point defects or creating a linear waveguide, or a planar array of coupled cavities. Yet another approach would be to include longitudinal variations of the parameters of the photonic crystal.

The practical implementation of this technique of enhanced terahertz radiation generation requires consideration of the electro-optic materials that can be used. A very good candidate is lithium niobate, $LiNbO_3$. It has a large electro-optic coefficient (large $\chi^{(2)}$) and a larger index of refraction at terahertz frequencies (n=6.3 at 1 THz) which allows for very good control of the dispersion relations in a periodically patterned lithium niobate sample. Other suitable materials are gallium arsenide (GaAs), other semiconductors with good electro-optic coefficients, and even poled polymers where the electro-optic coefficient is induced by the application of a large electric potential. The wavelength of terahertz radiation in free space at 1 THz is approximately 0.3 mm. This means the photonic crystals need to have a periodicity on the order of 100 μm and feature sizes on the order of tens of microns, easily amenable to fabrication.

A major limit in generating terahertz radiation from optical rectification in electro-optic materials comes from optical breakdown processes in these materials. More efficient generation should be obtained by increasing the optical power level but this power must be limited in order not to damage the sample. Note that our proposed scheme should improve the generated terahertz power levels because it increases the efficiency of generation while keeping the same level of the optical intensity.

If a very long length of propagation of the optical pulse through the photonic crystal is desired, a waveguide may be integrated in the photonic crystal to confine the optical pulse along a straight line. Also, a hybrid device can be imagined where the ultra-fast optical pulse travels through a narrow waveguide made of an electro-optic material which is surrounded by a photonic crystal made of different materials that has the role of modifying the density of states for the terahertz radiation.

Although the present invention has been shown and described with respect to several preferred embodiments thereof, various changes, omissions and additions to the form and detail thereof, may be made therein, without departing from the spirit and scope of the invention.

What is claimed is:

1. A system for generating terahertz (THz) radiation comprising a photonic crystal structure including at least one nonlinear material that enables optical rectification, said photonic crystal structure being configured to have the proper transverse dispersion relations and density photonic states so as to allow THz radiation to be emitted efficiently when an optical or near infrared pulse travels through the nonlinear part of said photonic crystal structure, said photonic crystal is configured to have a frequency range ($\Delta\omega$) equal to 0.1% or more around some $\omega_{Thz}$, such that the number of photonic states in the $\Delta\omega$ is >10 times larger or more than the number of photonic states the same frequency range would contain in the same, but unpatterned nonlinear material.

2. The system of claim 1, wherein said photonic crystal is configured to have a frequency range ($\Delta\omega$) equal to 0.1% around some $\omega_{Thz}$, such that the number of photonic states in the $\Delta\omega$ is >10 times larger than the number of photonic states the same frequency range would contain in the same, but unpatterned nonlinear material.

3. The system of claim 1, wherein said photonic crystal is configured to have a frequency range ($\Delta\omega$) equal to 0.1% around some $\omega_{Thz}$, such that the number of photonic states in the $\Delta\omega$ is >1000 times larger than the number of photonic states the same frequency range would contain in the same, but unpatterned nonlinear material.

4. The system of claim 1, wherein said photonic crystal is configured to have a frequency range ($\Delta\omega$) equal to 2% around some $\omega_{Thz}$, such that the number of photonic states in the $\Delta\omega$ is >10 times larger than the number of photonic states the same frequency range would contain in the same, but unpatterned nonlinear material.

5. The system of claim 1, wherein said photonic crystal is configured to have a frequency range ($\Delta\omega$) equal to 2% around some $\omega_{Thz}$, such that the number of photonic states in the $\Delta\omega$ is >1000 times larger than the number of photonic states the same frequency range would contain in the same, but unpatterned nonlinear material.

6. The system of any of the claims 2-5, wherein said incident optical or near infrared pulse travels through the nonlinear part of said photonic crystal, with a group velocity v such that the Cherenkov condition between $\omega_{Thz}$ and the longitudinal k-vector of the Terahertz radiation $k_{Thz}$ is satisfied at the narrow frequency range $\Delta\omega$, namely: $\omega_{Thz}=v*(k_{Thz}+G)$, where G is any reciprocal wavevector of the said photonic crystal.

7. The system of claim 6, wherein said photonic crystal comprises a 2D square lattice of dielectric rods.

8. The system of claim 6, wherein said photonic crystal comprises a 2D periodic photonic crystal structure.

9. The system of claim 6, wherein said photonic crystal comprises a 3D periodic photonic crystal structure.

10. The system of claim 6, wherein said photonic crystal comprises a 2D periodic photonic crystal slab.

11. The system of claim 6, wherein said photonic crystal comprises line defects.

12. The system of claim 6, wherein said photonic crystal comprises a planar array of coupled cavities to break symmetry of the photonic crystal in the transverse direction.

13. The system of claim 6, wherein said photonic crystal comprises longitudinal variations of the parameters of the photonic crystal.

14. The system of claim 6, wherein said photonic crystal comprises a linear waveguide to guide the incident or near infrared pulse.

15. A method of producing terahertz (THz) radiation comprising:
providing an optical or near infrared pulse;
providing a photonic crystal structure comprising at least one nonlinear material that enables optical rectification; and
configuring said photonic crystal structure to have the proper transverse dispersion relations and density photonic states so as to allow THz radiation to be emitted efficiently when said optical or near infrared pulse travels through the nonlinear part of the said photonic crystal structure, said photonic crystal is configured to have a frequency range ($\Delta\omega$) equal to 0.1% around some $\Delta_{Thz}$, such that the number of photonic states in the $\Delta\omega$ is >10 times larger or more than the number of photonic states the same frequency range would contain in the same, but unpatterned nonlinear material.

16. The method of claim 15, wherein said photonic crystal is configured to have a frequency range ($\Delta\omega$) equal to 0.1% around some $\omega_{Thz}$, such that the number of photonic states in the $\Delta\omega$ is >10 times larger than the number of photonic states the same frequency range would contain in the same, but unpatterned nonlinear materials.

17. The method of claim 15, wherein said photonic crystal is configured to have a frequency range ($\Delta\omega$) equal to 0.1% around some $\omega_{Thz}$, such that the number of photonic states in the $\Delta\omega$ is >1000 times larger than the number of photonic states the same frequency range would contain in the same, but unpatterned nonlinear materials.

18. The method of claim 15, wherein said photonic crystal is configured to have a frequency range ($\Delta\omega$) equal to 2% around some $\omega_{Thz}$, such that the number of photonic states in the $\Delta\omega$ is >10 times larger than the number of photonic states the same frequency range would contain in the same, but unpatterned nonlinear materials.

19. The method of claim 15, wherein said photonic crystal is configured to have a frequency range ($\Delta\omega$) equal to 2% around some $\omega_{Thz}$, such that the number of photonic states in the $\Delta\omega$ is >1000 times larger than the number of photonic states the same frequency range would contain in the same, but unpatterned nonlinear materials.

20. The method of any of the claims 16-19, wherein said incident optical or near infrared pulse travels through the nonlinear part of said photonic crystal, with a group velocity v such that the Cherenkov condition between $\omega_{Thz}$ and the longitudinal k-vector of the Terahertz radiation $k_{Thz}$ is satisfied at the narrow frequency range $\Delta\omega$, namely: $\omega_{Thz}=v*(k_{Thz}+G)$, where G is any reciprocal wavevector of the said photonic crystal.

21. The method of claim 20, wherein said photonic crystal comprises a 2D square lattice of dielectric rods.

22. The method of claim 20, wherein said photonic crystal comprises a 2D periodic photonic crystal structure.

23. The method of claim 20, wherein said photonic crystal comprises a 3D periodic photonic crystal structure.

24. The method of claim 20, wherein said photonic crystal comprises a 2D periodic photonic crystal slab.

25. The method of claim 20, wherein said photonic crystal comprises line defects.

26. The method of claim 20, wherein said photonic crystal comprises a planar array of coupled cavities to break symmetry of the photonic crystal in the transverse direction.

27. The method of claim 20, wherein said photonic crystal comprises longitudinal variations of the parameters of the photonic crystal.

28. The method of claim 20, wherein said photonic crystal comprises a linear waveguide to guide the incident or near infrared pulse.

29. A method of forming a terahertz (THz) radiation source comprising:
forming a photonic crystal structure including at least one nonlinear material that enables optical rectification; and
configuring said photonic crystal structure to have the proper transverse dispersion relations and density photonic states so as to allow THz radiation to be emitted efficiently when an optical or near infrared pulse travels through the nonlinear part of the said photonic crystal structure, said photonic crystal is configured to have a frequency range ($\Delta\omega$) equal to 0.1% around some $\omega_{Thz}$, such that the number of photonic states in the $\Delta\omega$ is >10 times larger or more than the number of photonic states the same frequency range would contain in the same, but unpatterned nonlinear material.

30. The system of claim 29, wherein said photonic crystal is configured to have a frequency range ($\Delta\omega$) equal to 0.1% around some $\omega_{Thz}$, such that the number of photonic states in the $\Delta\omega$ is >10 times larger than the number of photonic states the same frequency range would contain in the same, but unpatterned nonlinear materials.

31. The system of claim 29, wherein said photonic crystal is configured to have a frequency range ($\Delta\omega$) equal to 0.1% around some $\omega_{Thz}$, such that the number of photonic states in the $\Delta\omega$ is >1000 times larger than the number of photonic states the same frequency range would contain in the same, but unpatterned nonlinear materials.

32. The system of claim 29, wherein said photonic crystal is configured to have a frequency range ($\Delta\omega$) equal to 2% around some $\omega_{Thz}$, such that the number of photonic states in the $\Delta\omega$ is >10 times larger than the number of photonic states the same frequency range would contain in the same, but unpatterned nonlinear materials.

33. The system of claim 29, wherein said photonic crystal is configured to have a frequency range ($\Delta\omega$) equal to 2% around some $\omega_{Thz}$, such that the number of photonic states in the $\Delta\omega$ is >1000 times larger than the number of photonic states the same frequency range would contain in the same, but unpatterned nonlinear materials.

34. The system of any of the claims 30-33, wherein said incident optical or near infrared pulse travels through the nonlinear part of said photonic crystal, with a group velocity v such that the Cherenkov condition between $\omega_{Thz}$ and the longitudinal k-vector of the Terahertz radiation $k_{Thz}$ is satisfied at the narrow frequency range $\Delta\omega$, namely: $\omega_{Thz}=v*(k_{Thz}+G)$, where G is any reciprocal wavevector of the said photonic crystal.

35. The system of claim 34, wherein said photonic crystal comprises a 2D square lattice of dielectric rods.

36. The system of claim 34, wherein said photonic crystal comprises a 2D periodic photonic crystal structure.

37. The system of claim 34, wherein said photonic crystal comprises a 3D periodic photonic crystal structure.

38. The system of claim 34, wherein said photonic crystal comprises a 2D periodic photonic crystal slab.

39. The system of claim 34, wherein said photonic crystal comprises line defects.

40. The system of claim 34, wherein said photonic crystal comprises a planar array of coupled cavities to break symmetry of the photonic crystal in the transverse direction.

41. The system of claim 34, wherein said photonic crystal comprises longitudinal variations of the parameters of the photonic crystal.

42. The system of claim 34, wherein said photonic crystal comprises a linear waveguide to guide the incident or near infrared pulse.

* * * * *

UNITED STATES PATENT AND TRADEMARK OFFICE
CERTIFICATE OF CORRECTION

PATENT NO.       : 7,421,171 B2
APPLICATION NO.  : 11/765079
DATED            : September 2, 2008
INVENTOR(S)      : Ibanescu et al.

Page 1 of 1

It is certified that error appears in the above-identified patent and that said Letters Patent is hereby corrected as shown below:

Column 1, line 36 add:

-- SPONSORSHIP INFORMATION
This invention was made with government support by the National Science Foundation under Contract No. DMR-0213282 and the Army Research Office (ARO) under Grant Numbers DAAD19-02-D-0002 and W911NF-07-D-0004. The government has certain rights in the invention. --

Signed and Sealed this

Twenty-sixth Day of May, 2009

JOHN DOLL
*Acting Director of the United States Patent and Trademark Office*